United States Patent [19]
Wilson et al.

[11] Patent Number: 5,148,824
[45] Date of Patent: Sep. 22, 1992

[54] MIXING FAUCET HAVING REMOTE TEMPERATURE CONTROL

[75] Inventors: John R. Wilson, Naperville; Nhon T. Vuong, Lombard, both of Ill.

[73] Assignee: Sloan Valve Company, Franklin Park, Ill.

[21] Appl. No.: 648,972

[22] Filed: Jan. 31, 1991

[51] Int. Cl.⁵ .............................................. G05D 11/13
[52] U.S. Cl. ...................................... 137/3; 137/552; 137/607
[58] Field of Search ................... 137/606, 607, 3, 551, 137/552; 236/12.12

[56] References Cited

U.S. PATENT DOCUMENTS

| | | | |
|---|---|---|---|
| 4,420,811 | 12/1983 | Tarnay et al. | 137/607 X |
| 4,681,141 | 7/1987 | Wang | 137/607 |
| 4,696,428 | 9/1987 | Shakalis | 137/607 |
| 4,854,498 | 8/1989 | Stayton | 236/12.12 |
| 4,923,116 | 5/1990 | Homan | 236/12.12 |
| 4,928,732 | 5/1990 | Hu | 137/607 |

Primary Examiner—Stephen M. Hepperle
Attorney, Agent, or Firm—Kinzer, Plyer, Dorn, McEachran & Jambor

[57] ABSTRACT

An electro-mechanical mixing faucet for proportionally mixing hot and cold water in accordance with a user-selected mix ratio. A user-adjustable temperature selector produces a mix signal which adjusts hot and cold water valves to permit flow in amounts which will produce the desired temperature. The temperature selector includes a bank of LED's for indicating the selected temperature. When a user actuates the temperature selector, the LED's turn on brightly to indicate the selected temperature and also the water is immediately turned on. Following use of the faucet, the temperature selection is returned to a neutral temperature after a dormant period. An LED flashes when all hot water is demanded.

14 Claims, 4 Drawing Sheets

MIXING FAUCET HAVING REMOTE TEMPERATURE CONTROL

BACKGROUND OF THE INVENTION

This invention relates to electro-mechanical mixing faucets and is particularly concerned with a temperature controller which permits a user to select a desired water temperature.

Electro-mechanical mixing faucets allowing a form of user control of the temperature are known. Examples are shown in Groen et al, U.S. Pat. No. 3,556,146 and Yamamoto et al, U.S. Pat. No. 3,415,278. The devices of these patents allow the user to control openrng and closing of separate hot and cold water valves. Temperature control is achieved by turning on and off the hot and cold water as needed to achieve the desired mix.

One problem with this form of temperature control is if the user wishes to readjust the water temperature, he must remove his hands from the water stream in order to readjust the opening and closing of the valves. There is no provision for a temperature control signal that maintains the temperature once the user sets it.

SUMMARY OF THE INVENTION

The present invention relates to an electro-mechanical mixing faucet which includes a user-adjustable temperature selector. The temperature selector creates a mix signal which controls hot and cold water valves to produce the desired wate temperature. Once the mix signal is set, it will control the valves to produce the correct temperature. The user's hands are free to use the water stream.

The temperature selector includes a bank of LED's or other indicating device which assumes a dormant condition when the faucet is not in use. When a user arrives and manipulates the temperature selector, it immediately causes a bright LED condition to signal to the user that the faucet is functional.

Most faucets of this type, including the present invention, have a proximity sensor of some type which activates the water flow when a user places his or her hands underneath the faucet. Users unfamiliar with electro-mechanical faucets can be confused as to how to turn the faucet on. The present invention provides a switch of some type for the temperature controller. It can be arranged in a manner that indicates to the user that it is a faucet control. While it is actually the temperature controller, the temperature selector of this invention will also turn the water on immediately upon actuation of the selector for a predetermined time. This helps eliminate confusion as to how to turn the faucet on. Once the water is on, the user will typically place his or her hands under the faucet where the normal proximity detection then takes over and causes a continuation of the water flow for the necessary time.

When the user leaves the faucet, the temperature controller returns the temperature setting to a neutral setting for the next user. The LED then returns to its dormant condition.

Another aspect of the present invention is an indication that the user has selected the full hot temperature. The LED bank will have a flashing LED to show the extreme temperature selection has been made.

In yet another aspect, the invention contemplates a timer which disables the circuit if one of the temperature selection switches is actuated for longer than a predetermined time period.

DETAILED DESCRIPTION OF THE INVENTION

Figure 1:
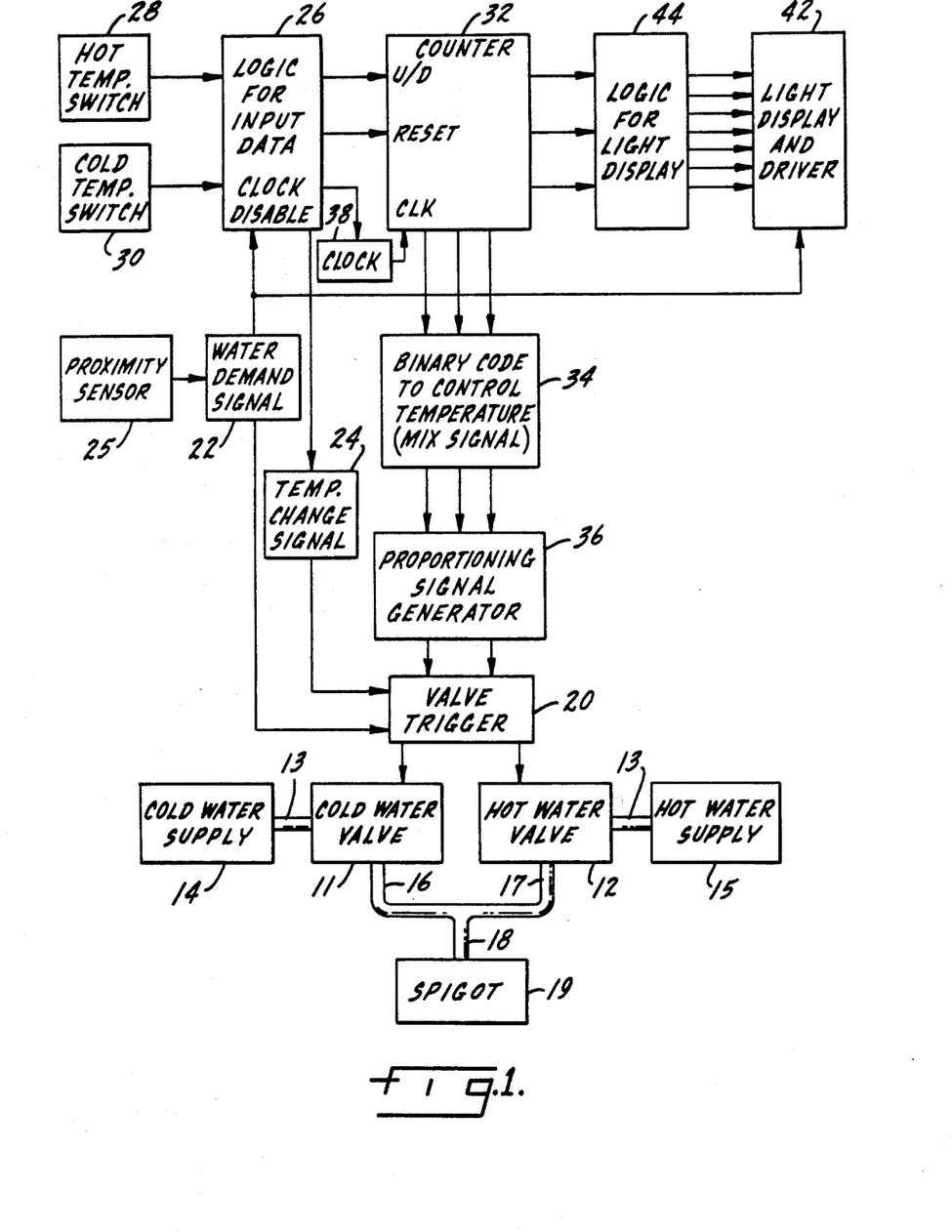
FIG. 1 is a block diagram of the control circuit and faucet of the present invention.

The invention is shown in block diagram form in FIG. 1. A pair of alternately operable solenoid valves 11 and 12 are connected to a cold water supply 14 and a hot water supply 15, respectively, through water lines 13. The cold water valve supplies a cold input stream in conduit 16 while valve 12 produces a hot input stream in conduit 17. Conduits 16 and 17 are joined to a single mixing conduit 18 where the water mixes together and is passed through a spigot 19 attached to the end of conduit 18. The relative volumes of hot and cold water released through the respective valves determine the temperature of the output stream.

For example, a mix ratio may be chosen where during each complete cycle of operation, the cold water valve 11 will be maintained opened for a time duration three times longer than the open time of the hot water valve 12. As another example, if a much warmer output stream is desired, the system may be adjusted to provide a mix ratio where the length of each periodically recurring, hot water pulse will be seven times greater than that of each intervening cold water pulse.

Consideration will now be given to the electronic circuitry for controlling the opening and closing of solenoid valves 11 and 12 in order to deliver water to spigot 19 having the desired mix ratio of hot and cold water, and thereby the desired temperature. The electronic circuitry is shown in block diagram form in FIG. 1. The valves 11 and 12 are opened and closed by a valve trigger circuit 20. The trigger is activated by either a water demand signal 22 or a temperature change signal 24.

The water demand signal 22 may be generated by a proximity sensor 25. The proximity sensor detects the presence of a user near the faucet and, if certain conditions are met, outputs a logic high condition which becomes the water demand signal 22. The water demand signal is supplied to the valve trigger 20 which turns the water on. Typically, the proximity sensor 25 will be focused on the area underneath the spigot so when a user places his or her hands under the spigot, the water will turn on. Such a system is disclosed in U.S Pat. 4,894,874, issued Jan. 23, 1990, and assigned to the present assignee. The disclosure of that patent is incorporated herein by reference.

The temperature change signal 24 is produced by an input data logic circuit 26. The input data logic circuit 26 receives signals from a user-adjustable selector means in the form of a hot temperature switch 28 and a cold temperature switch 30. Any suitable switch can be used including electro-mechanical, optical or proximity type devices. When one of the switches 28 or 30 is actuated, circuit 26 immediately generates the temperature change signal 24 which is supplied to the valve trigger 20. This opens the hot and cold water valves in accordance with a preset temperature.

Actuation of the hot and cold switches 28 and 30 also initiates a scrolling action to run the selected temperature up or down, respectively, from a preset neutral temperature (or from a previously set user-selected temperature). In the embodiment shown eight discrete temperature settings are available to the user. These eight settings are designated internally by a three-bit binary code referred to as a mix signal. That is, each separate setting can be designated by one of the eight binary numbers available with a three-bit code. Thus, the lowest temperature setting (where all cold water is supplied to the spigot 19) might be indicated with binary code 000. The highest setting (all hot water) could be indicated with binary code 111. The binary code is produced by the code conversion circuit 32 based on data received from the input logic circuit 26. The code conversion circuit 32 is an up-down counter. The binary-coded mix signal is shown schematically at 34 in FIG. 1.

The mix signal 34 is supplied to a proportioning signal generator 36. The proportioning signal generator 36 includes a clock and a counter to produce a periodically recurring, rectangular-shaped control signal for alternately opening an closing the solenoid valves. Details of this are described below. The valves are operated in alternation or push-pull so that when one valve is open the other valve is closed.

The code conversion circuit 32 receives pulses from a clock 38. The clock can be disabled by a signal from the input logic circuit 26. The clock disable signal is controlled by the hot and cold temperature switches in a manner described in detail below.

An indicator means provides visual feedback to tell the user which temperature level is currently selected The preferred indicator means is a bank of LED's included in a light display and driver circuit 42. A logic circuit 44 receives the three-bit binary mix signal from the conversion circuit 32 and, based on that information, controls the light driver to illuminate the LED which indicates the current temperature setting.

Figure 2:
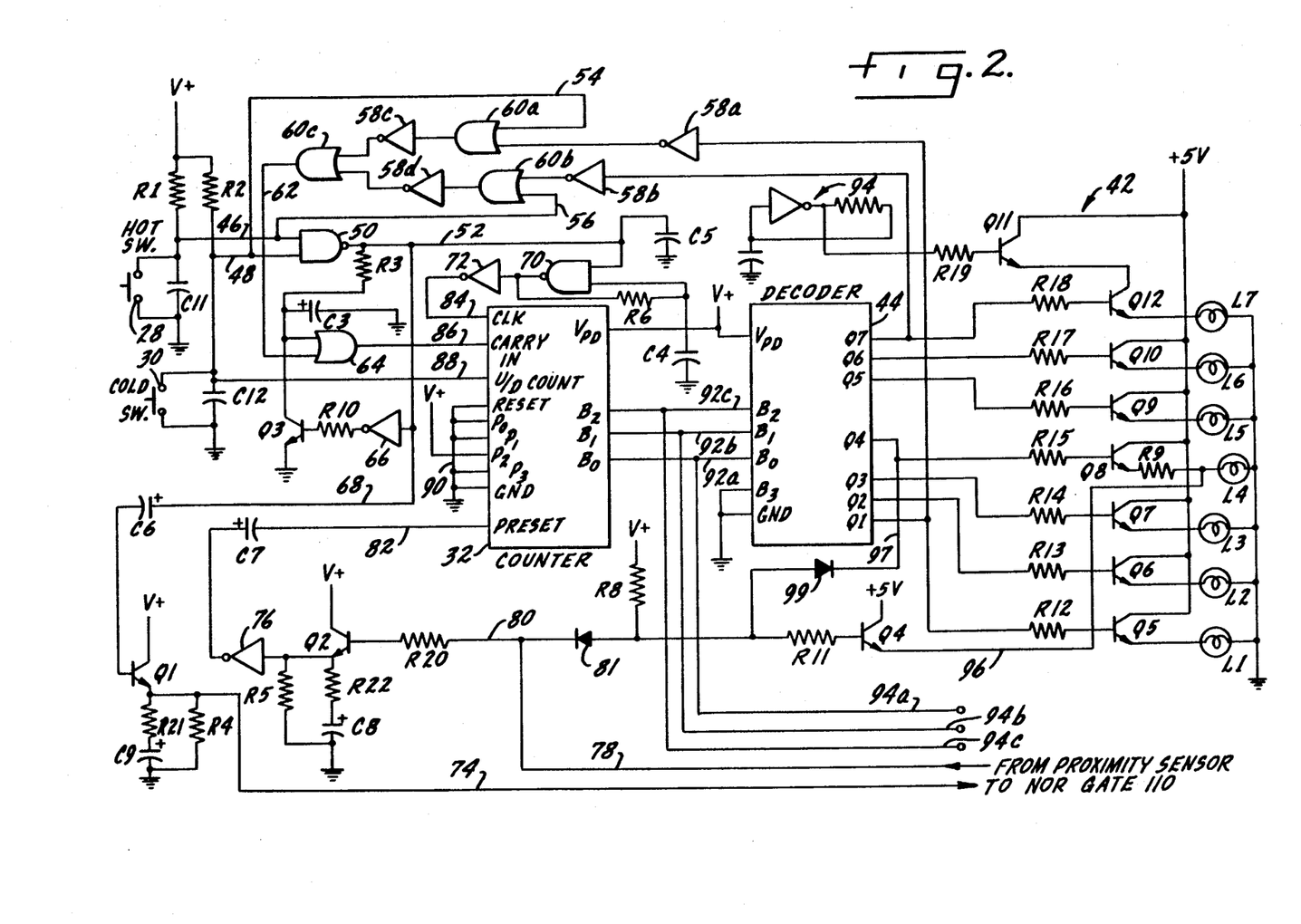
FIG. 2 is a circuit diagram of the temperature selection portion of the circuit.

FIG. 2 illustrates the circuitry for generating the three-bit binary-coded mix signal. The circuit includes hot switch 28 and cold switch 30 connected across capacitors C11 and C12, and in series with resistors R1 and R2 as shown. The high sides of C11 and C12 are connected by lines 46 and 48 to a NAND gate 50. The output of NAND gate 50 is on line 52.

The high sides of C11 and C12 are also connected by lines 54 and 56 to the inputs of a logic circuit comprising inverters 58 $a,b,c,d$ and OR gates 60 $a,b,c$ connected as shown. The logic circuit is provided for disabling the counter 32 in the event a temperature switch is held actuated even though the temperature signal is already at an extreme. The output of this logic circuit is fed on line 62 to OR gate 64.

The other input to OR gate 64 is from the output line 52 of NAND gate 50, through resistor R3. R3 and capacitor C3 form a malfunction timer. A drain circuit comprising inverter 66, resistor R10 and transistor Q3. It is connected to output line 52 by line 68 to reset the malfunction timer in a manner explained below.

The output 52 of NAND gate 50 connects to clock circuit 38 comprising capacitors C4 and C5, resistor R6, NAND gate 70 and inverter 72. The output 52 of NAND gate 50 also connects through line 68 to an opening means comprising capacitors C6 and C9, transistor Q1, and resistors R4 and R21. The opening means is connected to the valve trigger circuit by line 74.

Reset means includes resistors R5, R20 and R22, capacitors C7 and C8, transistor Q2 and inverter 76. Input to the reset means is from the proximity sensor 25 on lines 78 and 80. Line 80 has a diode 81 and connects to a voltage source through R8. It is important to note that the proximity sensor is arranged such that when no detection occurs, line 78 is connected to ground. When detection occurs, line 78 will have a logic high signal. Output from the reset means is on line 82.

The mix signal generating circuit of FIG. 2 includes the code conversion circuit 32, which is preferably a four-bit binary up and down counter, such as type 14516. Inputs to the counter include the reset circuit on line 82, the clock circuit on line 84, the logic circuit on line 86, the up/down count on line 88 and the preset signals on lines 90. The output of the counter 32 is the three-bit binary coded mix signal. The three bits of the binary-coded mix signal are output on pins $B_0$, $B_1$ and $B_2$ to lines 92$a,b,c$. Lines 94$a,b,c$ supply the mix signal to the proportioning signal generator.

The mix signal generating circuit of FIG. 2 also includes the light display logic circuit 44, which is preferably a binary to decimal decoder, such as type 14028. The binary mix signal is supplied to the decoder 44 on lines 92$a,b,c$. The decoder activates one of output pins Q1 through Q7 depending on the current mix signal. When the circuit is dormant, i.e., when no user is detected and no temperature selection has made recently made, pin Q4 is high. All the rest are low.

The output pins Q1 through Q7 are connected to the light display and driver circuit 42, which includes resistors R9 and R12-R19, transistors Q5-Q12 and LED's L1-L7. The driver circuit also has an oscillator 94 and a brightening circuit including R11 and transistor Q4 connected to the proximity detector on line 80 and to LED L4 by line 96. One side of R11 is also connected to the decoder 44 through line 97 and diode 99.

Figure 3:
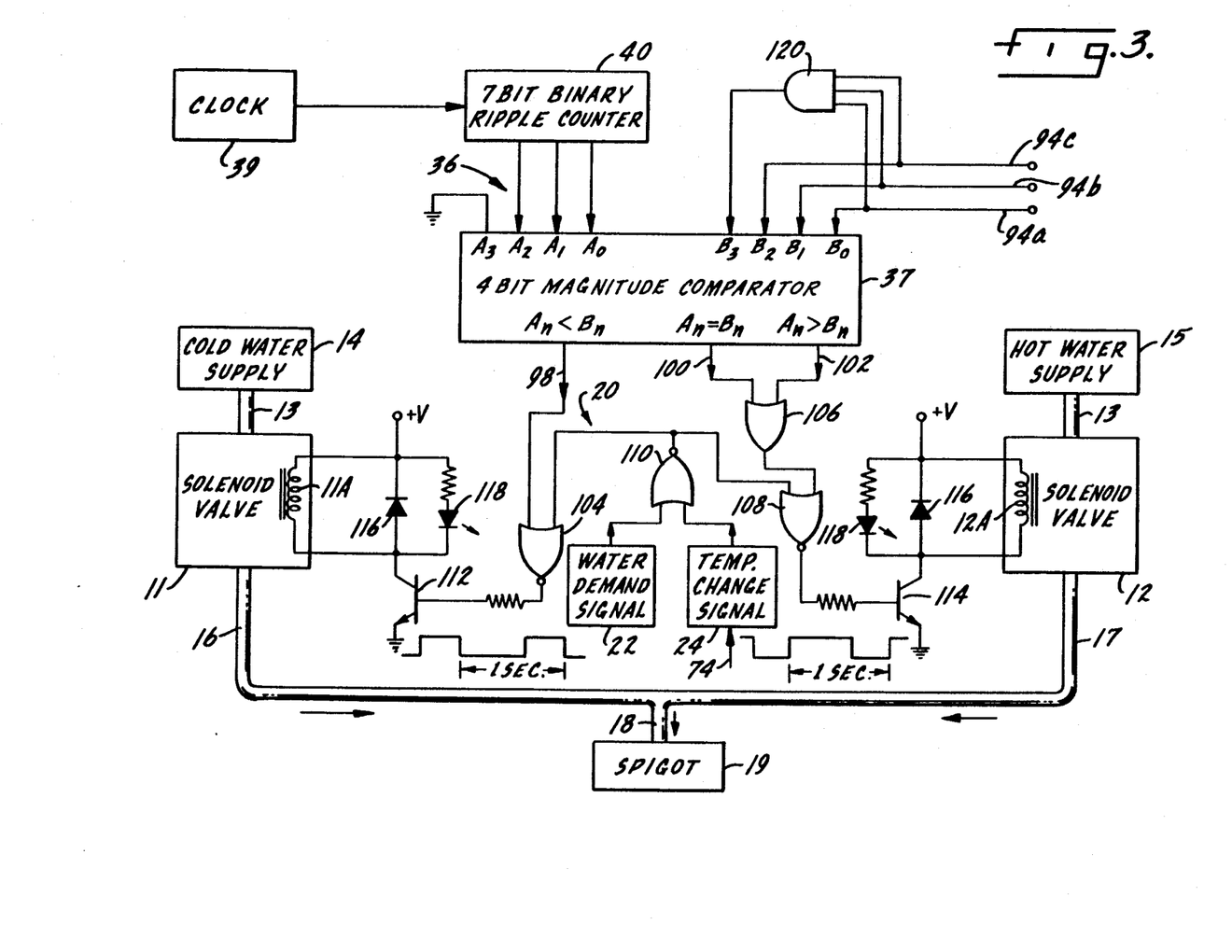
FIG. 3 is a block diagram of the valve actuating circuit.

FIG. 3 illustrates details of the proportioning signal generator 36 and valve trigger 20. The proportioning signal generator 36 includes a comparator 37, a clock 39 and a counter 40. Lines 94$a,b,c$ are connected to inputs labeled $B_0$ through $B_2$ of a conventional four bit magnitude comparator 37, such as a type 14585. Clock 39 delivers pulses to a seven bit binary ripple counter 40, which may be a type 14024 counter. Counter 40 supplies a count to the inputs $A_2$, $A_1$, $A_0$ of comparator 36.

The outputs of comparator 36 are on lines 98, 100 and 102. Line 98 is one input to NOR gate 104. Lines 100 and 102 connect to OR gate 106 and from there provide one input to NOR gate 108. The other input to gates 104 and 106 is the output of NOR gate 110. NOR gate 110 receives as input the water demand signal 22 from the proximity sensor 25 and the temperature change signal 24 from line 74 of FIG. 2. Together the NOR gates 104, 108 and 110 comprise the trigger circuit 20. The NOR gates 104 and 108 connect to solenoid actuating circuits including transistors 112, 114, diodes 116 and LED's 118.

The use, operation and function of the invention will now be described. Consider first the operation of the mix signal generating circuit of FIG. 2. The voltage level at each of the pins $B_0$, $B_1$ and $B_2$ of counter 32 will be either relatively high (logic 1) or relatively low (logic 0), depending on the selection of the user. It can be seen that the three lines 94$a,b,c$ provide eight different combinations of 0's and 1's and these eight combinations will constitute binary signals representing the eight binary numbers from 000 to 111, each of which will produce a different mix ratio in a manner to be explained.

The counter's pins labeled reset, $P_0$, $P_1$, $P_3$ and ground are all grounded, while pin $P_2$ has a logic high signal. This sets the default state of outputs $B_2$, $B_1$, $B_0$ to 1, 0, 0, respectively. This defines a mix ratio which is in the middle of the possible range of temperatures. Thus, the binary mix ratio 100 is supplied on output lines 94a,b,c in the dormant state of the mix signal circuit.

In the dormant state pin Q4 of the decoder 44 of the decoder is high, all the rest are low. Q8 is on and LED L4 is dimly lit through R9. It should be noted at this point that if a user is detected by proximity sensor (but the user does not actuate either switch 28 or 30), the sensor 25 will impose a logic high on line 78. This will close Q4 through line 80 and R11. Five volts then is applied directly to L4 through Q4 and line 96, bypassing R9. This causes the LED L4 to go from dim to bright.

Assume now that a user arrives at the faucet and actuates one of the temperature select switches 28 or 30 but does not place his or her hands under the spigot so the proximity sensor is not activated. The neutral or default temperature setting is altered by the user closing either the hot or cold switches 28 or 30. When this happens, one of the lines 46 or 48 goes low causing NAND gate 50 to output a logic high on lines 52 and 68. This has several effects. First, it opens Q3 of the drain circuit so C3 of the malfunction timer can start charging through line 52 and R3. Second, it activates the clock 38 (defined by C4, C5, R6, 70 and 72). Third, it activates the opening means.

Looking now at the opening means, capacitor C6 provides a one-shot pulse to transistor Q1, allowing charging of capacitor C9. A logic high is also provided to valve trigger 20 on line 74 which opens the cold and hot water valves immediately, in a manner explained below. The temperature at this point will be the default, neutral temperature. The valve trigger is activated until such time as capacitor C9 discharges.

In the preferred embodiment, the values of components of the opening means are selected so the logic high is provided to the valve trigger for about five seconds. The purpose of this is to turn the water on immediately upon actuation of a temperature selection switch even if the user has not placed his hands within the range of the proximity sensor. It is expected that once the water comes on, the user will place his or her hands under the spigot and within the proximity sensor's field which will then keep the water on after the opening means has timed out.

With the activation of the clock 38 the counter 32 will start to count up or down, depending on the condition of line 88. That is, it will count up if line 88 is high (indicating the depression of the hot switch) and it will count down if line 88 is low (due to actuation of the cold switch 30). As the counter counts clock pulses, outputs $B_0$, $B_1$, $B_2$ will change with each count. Thus, if the counter is counting up due to selection of the hot switch, the binary code in outputs $B_0$ through $B_2$ will increase with each pulse of the clock. The binary coded mix signal is sent to comparator 36 through lines 94, as shown.

The rate of scrolling through the available temperature range as the user depresses a select switch 28 or 30 is variable. The characteristics of the NAND gate 70 are such that it will not register logic high immediately. There is a delay of about 1-1.5 seconds before the first clock pulse changes the count, and therefore the mix signal. Thereafter, the pulses are output to line 84 at approximately 0.3 second intervals. Thus, there is a slight delay and then the count goes quickly so it will take two to three seconds for the temperature selection to go to one extreme or the other from the neutral temperature.

The purpose of the delay is to accommodate the typical user's physical reaction time. Most people cannot or will not release the select switch quickly. Without the delay the circuit would most likely scroll to the extreme setting before the user let go of the switch. The delay makes it possible for most users to step the temperature up or down one level at a time. After the initial delay, however, the circuit will quickly scroll the remaining steps to the extreme setting. This is to accommodate those users who expect fast response.

Assume now that the user has stepped the temperature up a level from the neutral setting. As mentioned above a new mix signal is sent to the comparator 37. The water is on either by virtue of the opening means or the proximity sensor. The light driver grounds pin Q4 of decoder 44, shutting off transistors Q8 and Q4, the latter through line 97. Thus, LED L4 is off. Pin Q5 of decoder 44 is high, turning on transistor Q9 and lighting LED L5.

Also, assuming the user puts his hands under the spigot, the proximity sensor 25 puts a logic high on line 80, closing transistor Q2 and charging the reset circuit capacitor C8. Note that diode 81 prevents the logic high on line 80 from firing transistor Q4 when pin Q4 is low. Now, after the user leaves the faucet, the proximity sensor grounds lines 78 and 80. When C8 discharges inverter 76 outputs logic high and C7 provides a one-shot pulse to the preset pin of counter 32. This resets the outputs $B_0$ through $B_2$ to the default, neutral temperature for the next user.

If a user selects the extreme hot temperature, pin Q7 of decoder 44 goes high and turns on transistor Q12. But the power line to LED L7 goes through Q11 which is turned on and off by oscillator 94. This provides enhanced visual feedback, warning the user that the water temperature may become dangerously hot.

The handling of abnormal conditions in the mix signal circuit will now be described. If the temperature selection switch is held down after an extreme temperature has been reached, one of the output pins Q1 or Q7 of the decoder will output a logic high to the logic circuit (defined by elements 58, 60 and 62). If an extreme temperature setting has been reached and there is continued depression of the hot or cold switch, the logic circuit will output a logic high to the OR gate 60c and from there to the carry-in pin of counter 32. When the carry-in pin is high, it defeats the clock 38 so that $B_0$, $B_1$, $B_2$ cannot change.

Along similar lines, when the capacitor C3 of the malfunction timer is charged (preferably at approximately 30 seconds), a logic high will be supplied to the OR gate 64 which also sets the carry-in pin high and disables further counting. This disables the apparatus if on of the switches malfunctions or is stuck in a closed position. The temperature setting is also returned to neutral. When the condition is resolved, the output of NAND gate 50 goes low and Q3 of the drain circuit closes, thereby quickly discharging capacitor C3 of the malfuntion timer so that normal operation can resume.

Turning now to the operation of the circuit in FIG. 3, the mix ratio generated as in FIG. 2 is supplied on lines 94a,b,c. In a specific embodiment, clock 39 runs at a frequency of 120 Hz. Counter 40 increments or steps through a 128-step counting sequence in about one second (specifically 1.06 seconds), after which the counter is reset and another sequence of 128 counting steps begins. For convenience, it will be assumed that one second (rounding off 1.06) is the period required for the counter to count through its entire sequence.

As counter 40 steps through its counting sequence it develops 128 different binary numbers. However, since the adjustable mix ratio (called $B_n$) fed to the comparator at inputs $B_0$, $B_1$, $B_2$ is limited to the eight binary numbers 000 to 111, only the three most significant bits are derived from counter 40 and supplied to the comparator 36. The eight different numbers represented by these bits are effectively spread out and evenly distributed over the one second operating cycle so they occur in sequence every one-eighth of a second. For this reason, only three connections are made between the counter 40 and the inputs $A_2$, $A_1$, $A_0$ of comparator 37.

After every one-eighth of a second a different binary number is supplied to the inputs of the comparator. More specifically, when the counter is reset, number 000 is sent to the comparator. One-eighth of a second later the number 001 is delivered. In similar fashion, during succeeding one-eighth second intervals, the binary numbers 010, 011, 100, 101, 110 and 111 are sequentially applied to inputs $A_0$ to $A_2$. Then the counter resets or returns to number 000 and commences another counting cycle. The progressively increasing binary number from counter 40 during each one second cycle is referred to as $A_n$.

Comparator 37 thus receives a counter binary number $A_n$ and a binary number $B_n$ designating the selected, desired mix ratio. The comparator functions in a well-known manner to determine the instantaneous relationship between numbers $A_n$ and $B_n$.

When a water demand signal occurs because the proximity sensor detects a user, or when the user actuates one of the hot or cold temperature switches, NOR gate 110 applies a logic 0 to the input of NOR gate 104. Inasmuch as a NOR gate outputs a logic 0, if either one of its inputs is logic 1, a logic 1 output signal cannot be developed unless either detection takes place or a temperature switch is activated. Further, if the counter number $A_n$ is less than the mix signal $B_n$, output 98 will be logic 1 and the output of NOR gate 41 will be logic 0, regardless of the state of the NOR gate 110. As long as the NOR gate 104 produces a logic 0, transistor 112 will not conduct and solenoid coil 11A remains deenergized.

Assuming that detection occurs or that a temperature switch is activated, thereby producing a logic 0 from gate 110, whenever the counter $A_n$ is less than mix signal $B_n$, solenoid valve 11 will be closed. As a result, during the early stages of the one second operating cycle, when the counter $A_n$ is usually less than the mix signal $B_n$, solenoid valve 11 will initially be closed. It will remain so until $A_n$ reaches $B_n$. As will be explained later, during this first portion of the complete cycle when the cold water remains shut off solenoid valve 12 will be opened to permit the flow of hot water to conduit 17.

When counter 40 counts up to $B_n$ (and still assuming a logic 0 from gate 110), output 98 switches to logic 0 whereupon the output of NOR gate 104 goes high. This turns on transistor 112 to permit energization of coil 11A, thereby opening valve 11. Cold water now flows through the valve to conduit 16 and spigot 19 and will continue to do so until the counting sequence is completed and the counter is reset back to number 000. During this interval or pulse of cold water flow, valve 12 will be closed. Of course, during each succeeding cycle of counting steps, solenoid valve 11 will be closed (and valve 12 will be opened) until the selected number $B_n$ is obtained, at which time valve 11 is open while valve 12 is closed.

Diode 116 is connected in shunt with coil 11A in order to dissipate the magnetic energy stored in the coil after the transistor is turned off. A visual indication of the operation of the actuating circuitry for solenoid valve 11 is afforded by LED 118.

Turning now to the hot water solenoid 12, until number $B_n$ is reached in each sequence of counting steps, outputs 100 and 102 of comparator 36 will be at logic 0, resulting in a logic 0 output from OR gate 106, which is passed to NOR gate 108. Assuming that a user generates a water demand signal by being in the detection zone (or actuates a hot or cold temperature selection switch), NOR gate 110 outputs a logic 0 to the NOR gate 108. With both inputs to NOR gate 108 at logic 0, the output will be high, turning on transistor 114 and energizing coil 12A. Valve 12 opens to admit hot water flow to the spigot 19.

When number $B_n$ is reached by counter 40 during each operating cycle, OR gate 106 receives at least one logic 1 signal from outputs 100 and 102. Thus, whenever $A_n$ is equal to or greater than $B_n$, OR gate 106 produces a logic 1 for application to NOR gate 108, thereby resulting in logic 0 from the NOR gate. When the NOR output goes low, the transistor 114 turns off and closes the valve 12.

AND gate 120 is included for a special case when the selected mix ratio $B_n$ is at an extreme end to ensure that only one of the solenoid valves is actuated. Specifically, AND gate 120 detects the highest number 111 which corresponds to a temperature selection of all hot water. AND gate 120 supplies a logic 1 to input $B_3$ of comparator 37. In this way, number $B_n$ will always be higher than $A_n$ regardless of the count output.

It can be seen from the above the NOR gates 104 and 106 produce periodically recurring, rectangular-shaped control signals, having a period of one second, for alternately opening and closing its associated solenoid valve in alternation. The two control signals are phase opposed with the relative widths of the pulse components of each control signal effectively connoting the mix ratio of the hot and cold water. By adjusting the signals $B_0$ through $B_2$, the wave shape of each of the two control signals is regulated in order to select the portion of the time period (one second) of each complete cycle that one valve is open and the other is closed, and vice versa, tnereby maintaining a fixed mix ratio.

Typical control signals are shown by the two voltage wave forms in FIG. 3. Each wave form is the phase-opposed counterpart of the other and illustrates, by way of example, the case when the selected mix ratio number $B_n$ is 101. For the first five-eighths of the one second cycle, the voltage at the output of gate 104 will be low while the output at gate 108 will be high, whereas during the remaining three-eighths of the one second cycle the voltage levels are reversee.

Figure 4:
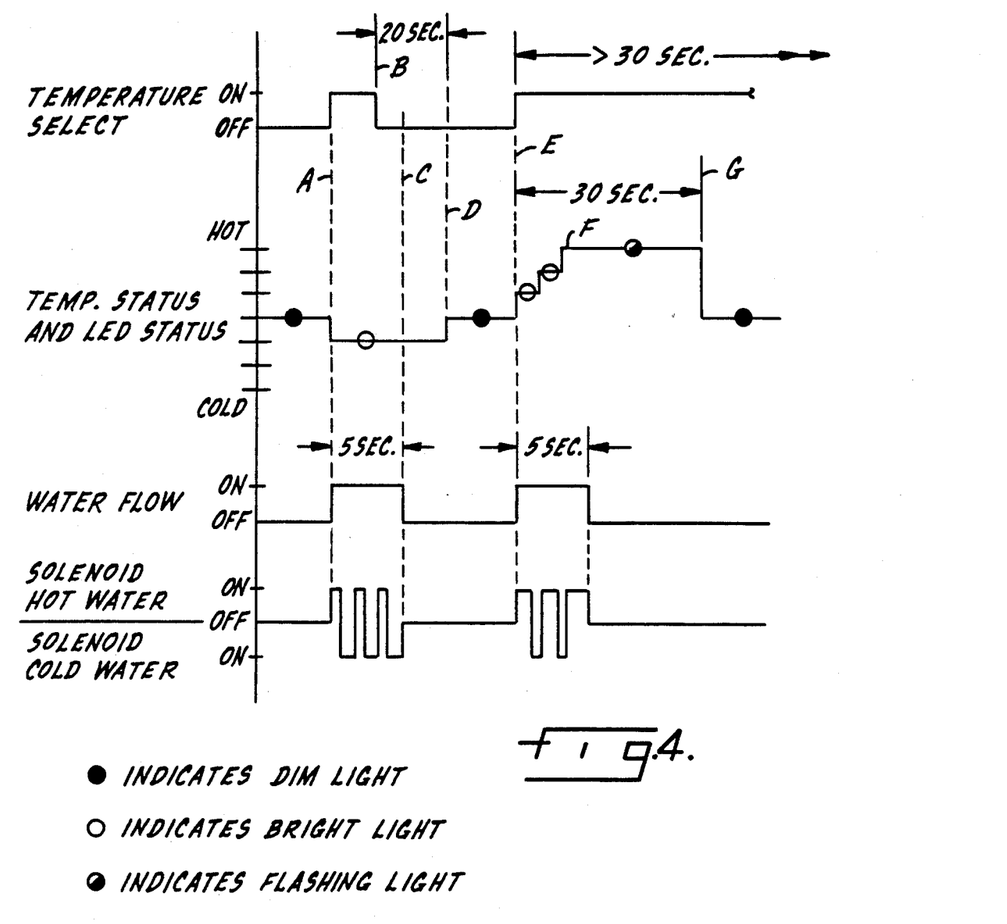
FIG. 4 is a timing diagram showing the operation of the temperature selector.

The timing diagram of FIG. 4 effectively illustrates the described operation. At time zero to time A, the circuit is in its dormant state, i.e., the temperature setting is neutral and the LED L4 is dimly lit. At time A, a user presses, say, the cold temperature select switch. The water flow starts immediately, with the hot and cold water solenoids cycling on and off alternately for equal time slices, as show at the bottom of FIG. 4. The LED for the selected temperature is brightly lit. At time B the user releases the cold switch. The water stays on until time C, which is five seconds after the switch was pressed, at which point the water shuts off (assuming the user did not activate the proximity switch which would xeep the flow on). At time D, twenty seconds after the cold switch was released, the dormant timer returns the temperature setting to neutral and the LED goes dim.

The next user actuates the hot switch at time E. The LED's go bright and step up the temperature status. The water flow starts and lasts five seconds, with the hot water valve open longer than the cold water valve. At time F the extreme hot setting is reached the LED flashes out a warning. The user holds the hot switch down for a time greater than thirty seconds. But at time G, thirty seconds after the actuation of the hot switch, the malfunction timer shuts down the counter 32, returning the temperature setting to neutral and dimly lighting the neutral LED.

Whereas as a preferred form of the invention has been shown and described, it will be realized that alterations could be made thereto without departing from the :cope of the following claims. For example, the number of temperature levels could be other than the eight shown. Similarly, the LED readout could be other than the discrete LED's shown. Hall effect switches or the like could be substituted for the push-butron temperature select switches shown.

We claim:

1. A mixing faucet for proportionately mixing volumes of first and second fluids to blend the two fluids in accordance with a user-selected mix ratio, comprising:
   user-adjustable selector means for producing a mix signal representative of a desired mix ratio; means responsive to said mix signal for producing a proportioning signal;
   firt and second valve means for controlling the flow of the first and second fluids, respectively, the valve means being responsive to the proportioning signal to open and permit flow of the first and second fluids in such amounts as to produce the desired mix ratio;
   opening means for sending the proportioning signal to the valves immediately upon use of the selector means and for a predetermined finite time period; and
   user-actuatable enabling means for selectably sending the proportioning signal to the vale means at least at the end of said predetermined finite time period.

2. The structure of claim 1 wherein the enabling means includes a proximity sensor for sensing the presence or absence of a user near the faucet, and further comprising:
   indicator means, responsive to the selector means and to said proximity sensor, for indicating the presently selected mix ratio, the indicator means having at least a first state which the indicator assumes after a preselected time period of non-use of the selector means, and a second state which the indicator means assumes immediately when tne proximity sensor detects the presence of a user.

3. The structure of claim 2 further comprising:
   reset means, responsive to the proximity sensor, for adjusting the mix signal to a neutral mix ratio after a predetermined finite time period following sensing of the absence of a user.

4. The structure of claim 3 further characterized in that the indicator means has at least a third state which the indicator assumes to indicate a non-extreme mix ratio and a fourth state which the indicator means assumes immediately upon the selection cf an extreme mix ratio.

5. The structure of claim 2 further characterized in that the indicator means has at least a third state which the indicator assumes to indicate a non-extreme mix ratio and a fourth state which the indicator means assumes immediately upon the selection of an extreme mix ratio.

6. The structure of claim 1 wherein the enabling means includes a proximity sensor for sensing the presence or absence of a user near the faucet, and further comprising:
   reset means, responsive to the proximity sensor, for adjusting the mix signal to a neutral mix ratio after a predetermined finite time period following sensing of the absence of a user.

7. The structure of claim 6 further comprising:
   indicator means, responsive to the selector means, for indicating the presently selected mix ratio, the indicator means having at least a first state which the indicator assumes to indicate a non-extreme mix ratio and a second state which the indicator means assumes immediately upon the selection of an extreme mix ratio.

8. The structure of claim 1 further comprising:
   indicator means, responsive to said selector means, for indicating the presently selected mix ratio, the indicator means having at least a first state which the indicator assumes to indicate a non-extreme mix ratio and a second state which the indicator means assumes immediately upon the selection of an extreme mix ratio.

9. A mixing faucet for proportionately mixing volumes of first and second fluids to blend the two fluids in accordance with a user-selected mix ratio comprising:
   user-adjustable selector means for producing a mix signal representative of a desired mix raatio;
   means responsive to said mix signal for producing a proportioning signal;
   first and second valve means for controlling the flow of the first and second fluids, respectively, the valve means being responsive to the proportioning signal to open and permit flow of the first and second fluids in such amounts as to produce the desired mix ratio;
   user-actuatable enabling means for selectably sending the proportioning signal to the valve means, the enabling means including a proximity sensor for sensing the presence or absence of a user near the faucet;
   indicator means, responsive to the selector means and to said proximity sensor, for indicating the presently selected mix ratio, the indicator means having at least a first state which the indicator assumes after a preselected time period of non-use of the selector means, and a second state which the indicator means assumes immediately when the proximity sensor detects the presence of a user; and reset means, responsive to the proximity sensor, for adjusting the mix signal to a neutral mix ratio after a predetermined finite time period following sensing of the absence of a user.

10. The structure of claim 9 further characterized in that the indicator means has at least a third state which the indicator assumes to indicate a non-extreme mix ratio and a fourth state which the indicator means assumes immediately upon the selection of an extreme mix ratio.

11. The structure of claim 9 further characterized in that the indicator means has at least a third state which the indicator assumes to indicate a non-extreme mix ratio and a fourth state which the indicator means assumes immediately upon the selection of an extreme mix ratio.

12. A mixing faucet for proportionately mixing volumes of first and second fluids to blend the two fluids in accordance with an adjustably selected mix ratio, comprising:
   user-adjustable selector means for producing a mix signal representative of a desired mix ratio;
   means responsive to said mix signal for producing a proportioning signal;
   first and second valve means for controlling the flow of the first and second fluids, respectively, the valve means being responsive to the proportioning signal to open and permit flow of the first and second fluids in sucn amounts as to produce the desired mix ratio;
   user-actuatable enabling means for selectably sending the proportioning signal to the valve means, the enabling means including a proximity sensor for sensing the presence or absence of a user near the faucet; and
   reset means, responsive to the proximity sensor, for adjusting the mix signal to a neutral mix ratio after a predetermined finite time period following sensing of the absence of a user.

13. The structure of claim 12 further comprising:
   indicator means, responsive to said selector means, for indicating the presently selected mix ratio, the indicator means having at least a first state which the indicator assumes to indicate a non-extreme mix ratio and a second state which the indicator means assumes immediately upon the selection of an extreme mix ratio.

14. In a mixing faucet of the type having first and second valve means for controlling the flow of first and second fluids, respectively, a method of operating the mixing faucet for proportionately mixing volumes of the first and second fluids to blend the two fluids in accordance with a user-selected mix ratio, comprising the steps of:
   producing a mix signal representative of a desiree mix ratio;
   producing a proportioning signal in accordance with the mix ratio, the proportioning signal being capable of opening the first and second valve means in accordance with the mix signal to produce the desired mix ratio;
   applying the proportioning signal to the valve means immediately upon production of a mix signal for a predetermined finite time period; and
   thereafter selectably sending the proportioning signal to the valve means at least at the end of said predetermined finite time period in accordance with the setting of a user-actuatable enabling means.

* * * * *